United States Patent [19]

Yazane et al.

[11] 4,117,741
[45] Oct. 3, 1978

[54] COLLAPSIBLE STEERING COLUMN

[75] Inventors: Shigeru Yazane, Sakado; Youetsu Mogami, Fujimi, both of Japan

[73] Assignee: Honda Giken Kogyo Kabushiki Kaisha, Tokyo, Japan

[21] Appl. No.: 746,510

[22] Filed: Dec. 1, 1976

[51] Int. Cl.² .............................................. B62D 1/18
[52] U.S. Cl. ...................................... 74/492; 188/1 C
[58] Field of Search ................................. 74/492, 493

[56] References Cited

U.S. PATENT DOCUMENTS

| 3,492,888 | 2/1970 | Nishimura et al. | 188/1 C X |
| 3,578,782 | 5/1971 | Miyoshi | 74/492 X |
| 3,621,732 | 11/1971 | Kaniut | 74/492 |
| 3,815,437 | 6/1974 | Martin | 74/492 |
| 3,929,030 | 12/1975 | Sukeshita | 74/492 |

FOREIGN PATENT DOCUMENTS 1,936,994   2/1971   Fed. Rep. of Germany ............. 74/492

Primary Examiner—Allan D. Herrmann
Attorney, Agent, or Firm—Lyon & Lyon

[57] ABSTRACT

A collapsible steering column system which allows for the forward movement of the steering column upon vehicle impact without movement of the gear box. The system includes a steering shaft housed within a steering column and a collapsible plate means positioned adjacent the steering column, the steering column being provided with a press plate member which is positioned to engage the collapsible plate means.

9 Claims, 12 Drawing Figures

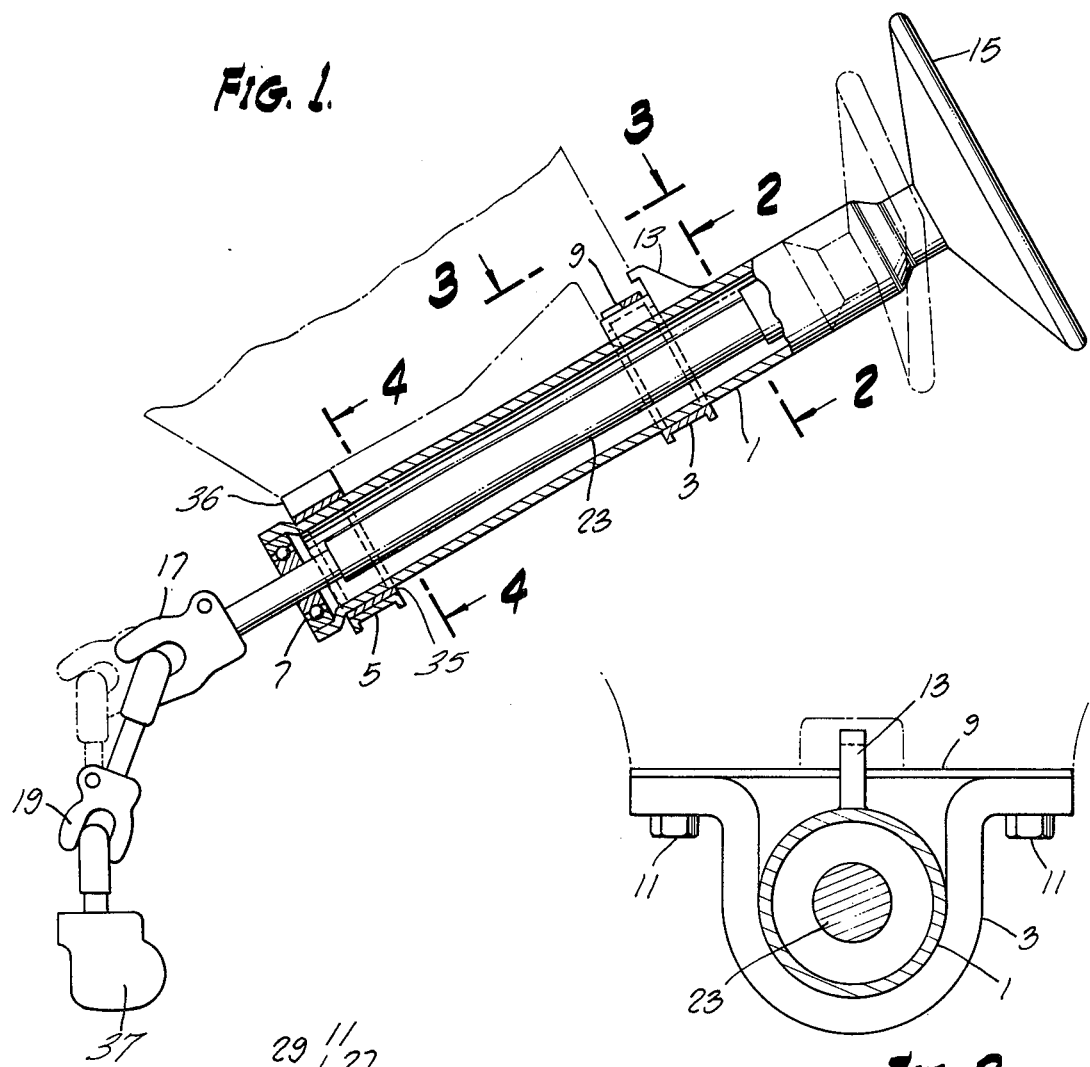
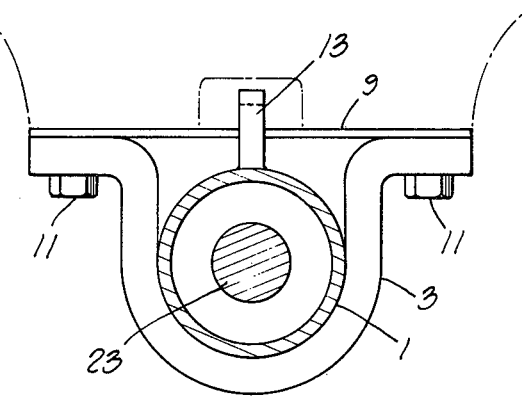
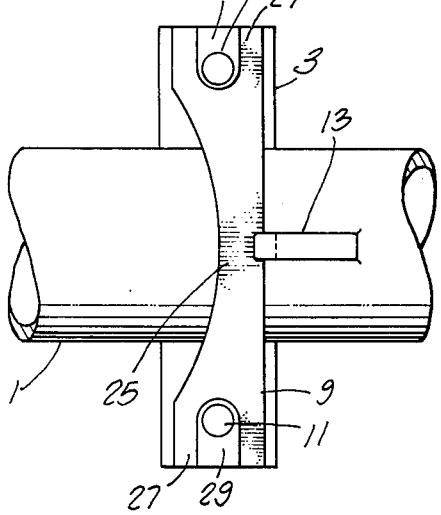
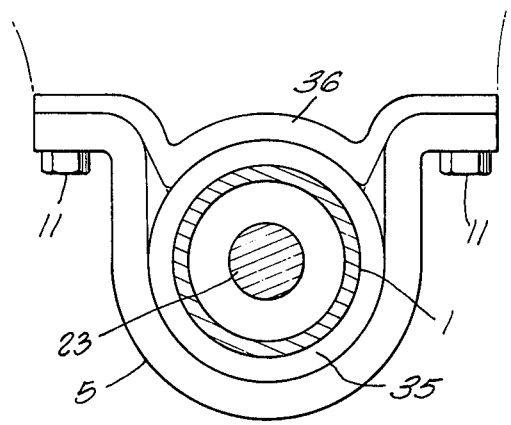

COLLAPSIBLE STEERING COLUMN

The present invention is directed to a vehicle steering apparatus, more specifically the invention is directed to a collapsible steering column system.

In accordance with this invention, a collapsible steering column system is provided having a steering shaft which is housed within a steering column and which is restrained by a collapsible plate means positioned adjacent the steering column. A press plate member is secured to the steering column and positioned to engage the collapsible plate means. At impact, the steering column and the press plate which is attached to it are driven into the collapsible plate and the steering column moved forward as the collapsible plate means gradually collapses. The steering shaft may be coupled to the vehicle gear box by means of first and second universal joints thereby allowing the steering shaft to move forward without movement of the gear box.

In a preferred embodiment, a plurality of collapsible plates are utilized and are positioned such that they are collapsed sequencially in order to absorb a sustained high load as might be experienced upon a collision involving the vehicle. Such a system substantially decreases the danger of injury to a vehicle driver caused by impact with the steering column or steering wheel attached thereto.

FIG. 1 is a partial cross-sectional view illustrating an embodiment of this invention.

FIG. 2 is a cross-sectional view taken about 2—2 of FIG. 1.

FIG. 3 is a side view taken about 3—3 of FIG. 1.

FIG. 4 is a cross-sectional view taken about 4—4 of FIG. 1.

Figure 5:
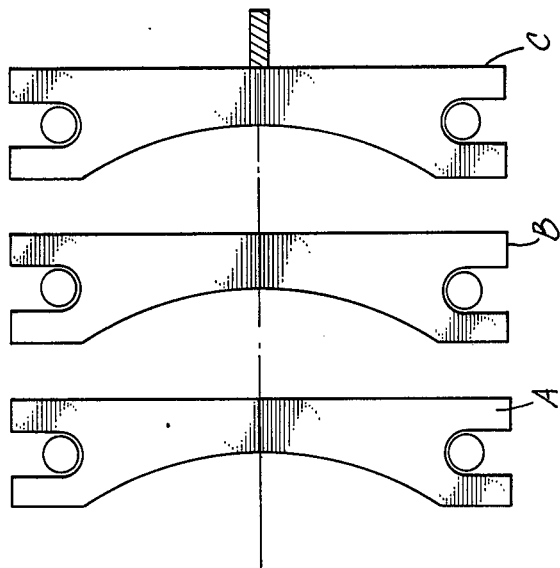
FIGS. 5, 7 and 9 are side views of a portion of the present invention.

Referring now to FIGS. 1 and 4, a steering shaft 23 is housed within a steering column 1. A steering wheel 15 is mounted to the steering shaft 23, and the steering shaft 23 is connected to a gear box 37 by means of a first universal joint 17 and a second universal joint 19. Ball bearings 7 are provided for rotation of the steering shaft 23. The steering column 1 may be mounted to the vehicle body by means of front and rear support bracket members 3 and 5 respectively. Between bracket 5 and the steering column 1 there is provided a locating collar 35 housed between brackets 5 and a matingly profiled elongated plate 36.

Referring now to FIGS. 2 and 3, the collapsible plate means of the invention will be described in detail. A press plate 13 is secured to the steering column 1 by a suitable means such as welding. The collapsible plate means 9 is positioned adjacent the steering column 1 so as to engage the press plate 13. In a preferred embodiment, the collapsible plate means is made up of one or more collapsible plates having a portion of reduced cross-sectional area 25 and end portions 27 adapted to anchor said collapsible plate means 9 as by having apertures 29 therein adapted to receive a securing means 11 such as a bolt.

Figure 7:
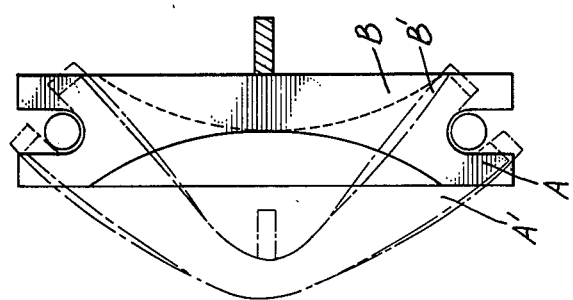
Figure 9:
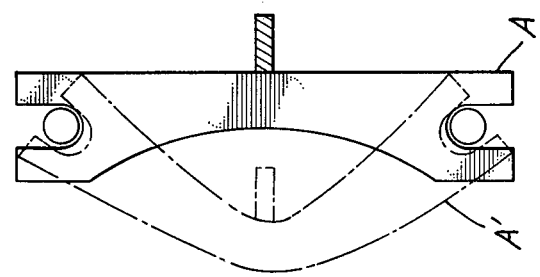
Figure 6:
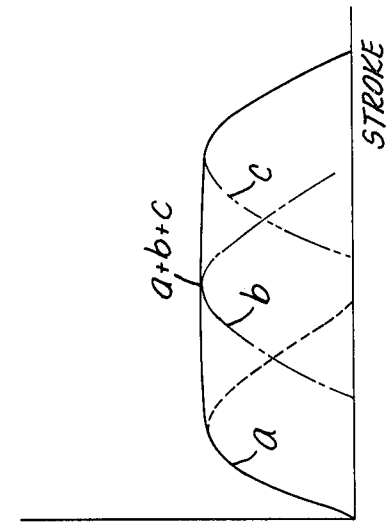
FIGS. 6, 8 and 10 are graphs illustrating the load absorbed as a function of steering column movement and relate, respectively, to FIGS. 5, 7 and 9.
Figure 8:
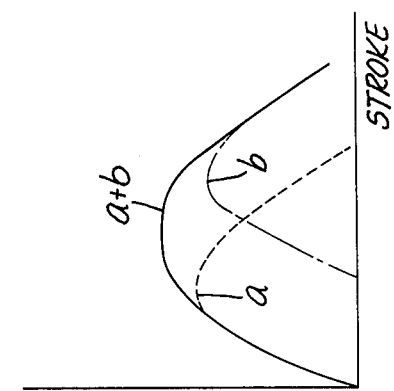

Referring to FIGS. 5-11, the ability of the collapsible steering column system to absorb an impact loading is illustrated. As shown in FIG. 5, at impact, the press plate member 13 collapses the collapsible plate means 9 thereby absorbing the load created at impact. This load absorption is illustrated in FIG. 6. FIGS. 7 and 8 illustrate, respectively, two and three collapsible plates being collapsed by a press plate member.

Figure 10:
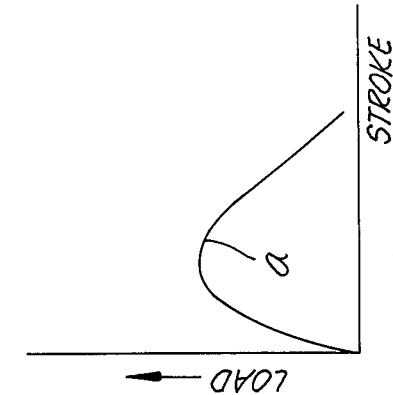
Figure 11:
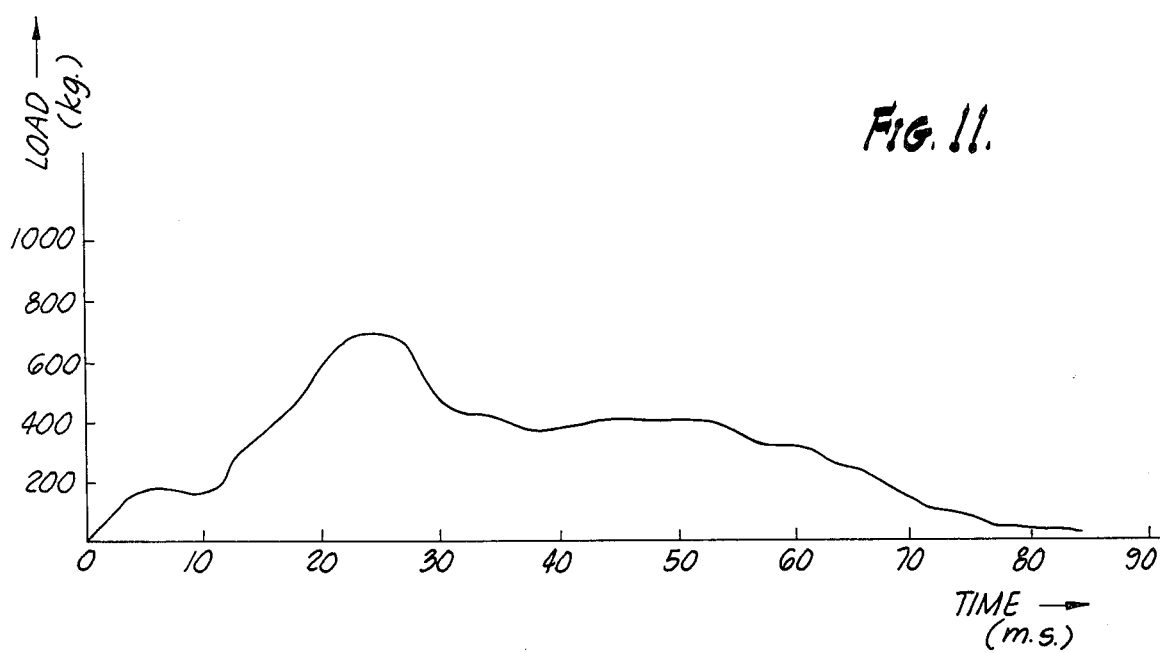
FIG. 11 is a graph illustrating the load absorbed by the system of the present invention as a function of time.

FIGS. 8 and 10 (respectively) illustrate the impact loading absorbed by the collapsible plate as a function of the forward movement of the steering column. As shown in FIGS. 7 and 8, when the collapsible plates are anchored at the same point, the mamimum loading is greater than the maximum loading for an individual collapsible plate as the energy absorbed by the two plates is cumulative over a portion of the steering column forward movement. FIG. 11 illustrates the impact loading as a function of time.

Figure 12:
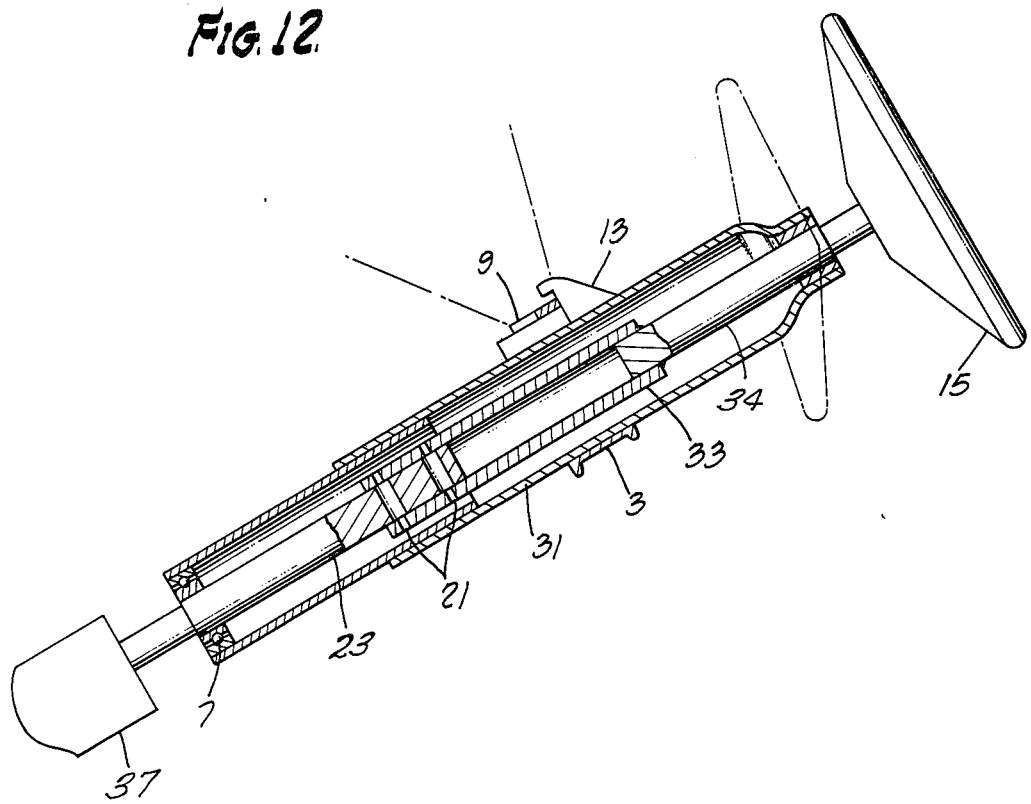
FIG. 12 is a view in partial cross-section illustrating an embodiment of the invention.

FIG. 12 illustrates a further preferred embodiment wherein a steering column sleeve 31 is slideably positioned about the steering column 1, and a steering shaft sleeve 33 is slideably positioned about the steering shaft 23. The press plate member 13 is attached to the steering column sleeve 31 and positioned in an engaging relationship with the collapsible plate means 9, thus restraining movement of the steering column sleeve 31. The steering shaft sleeve 33 is positioned relative to the steering shaft 23 and restrained in such position by means of shear pins 21. A further shaft 34 is welded to the sleeve 33 and at its forward end is affixed to the steering wheel 15.

At impact, the steering column sleeve 31 is allowed to move forward relative to the steering column 1 as the collapsible plate means 9 is collapsed. Similarly, the steering shaft sleeve 33 is allowed to move forward relative to the steering shaft 23 as the shear pins 21 are sheared. As the steering column 1 and steering shaft 23 remain stationery, no forward movement is translated to the gear box 37.

Having described our invention in detail, it is to be understood that we do not wish to be limited to the details herein set forth, our invention including modifications which may be made by others skilled in the art without departing from the scope of the claims appended hereto.

We claim:

1. A collapsible steering column system comprising a steering shaft housed within a steering column; collapsible plate means positioned adjacent said steering column; and a press plate member secured to said steering column and positioned to engage said collapsible plate means and restrain said steering column, whereby said press plate member engages and collapses said collapsible plate means at impact and allows said steering column to move forward, and wherein said collapsible plate means is further defined as a plate having a portion of reduced cross-sectional area and two end portions adapted to anchor said collapsible plate means; and said press plate member is positioned to engage said portion of reduced cross-sectional area of said collapsible plate.

2. The collapsible steering column system claimed in claim 1 wherein said steering shaft is connected to a gear box by means of first and second universal joints, whereby said gear box remains in a stationary position relative to said steering column which moves forward at impact.

3. The collapsible steering column system claimed in claim 1 wherein said collapsible plate means is further defined as a plurality of plates, each having a portion of reduced cross-sectional area and two end portions adapted to anchor said collapsible plates; and said press plate member is positioned to engage said portions of reduced cross-sectional area of said collapsible plates.

4. A collapsible steering column system comprising a steering shaft housed within a steering column; collapsible plate means positioned adjacent said steering column; a gear box; first and second universal joints connecting said steering shaft to said gear box; and a press plate member secured to said steering column and positioned to engage said collapsible plate means and restrain said steering column, whereby said plate member engages and collapses said collapsible plate means at impact and allows said steering column to move forward without relative movement of said gear box, and wherein said collapsible plate means is further defined as at least one collapsible plate having a portion of reduced cross-sectional area and two end portions adapted to anchor said collapsible plate means; and said press plate member is positioned to engage said portion of reduced cross-sectional area of said collapsible plate.

5. The collapsible steering column system claimed in claim 4 wherein said collapsible plate means is further defined as a plurality of collapsible plates, each having a portion of reduced cross-sectional area and two end portions adapted to anchor said collapsible plates; and said press plate member is positioned to engage said portion of reduced cross-sectional area of said collapsible plates.

6. A collapsible steering column system comprising a steering shaft housed within a steering column; at least one collapsible plate having a portion of reduced cross-sectional area and end portions adapted to anchor said collapsible plate, said collapsible plate being positioned adjacent said steering column; a gear box; first and second universal joints connecting said steering shaft to said gear box; and a press plate member secured to said steering column and positioned to engage said reduced cross-sectional area portion of said collapsible plate and restrain said steering column, whereby said plate member engages and collapses said collapsible plate at impact and allows said steering column to move gradually forward without relative movement of said gear box.

7. The collapsible steering column system claimed in claim 6 wherein two collapsible plates are provided and have common anchor points.

8. The collapsible steering column system claimed in claim 6 wherein three collapsible plates are provided and are anchored at adjacent positions along said steering column.

9. A collapsible steering column system comprising a steering shaft; a steering shaft sleeve slideably positioned about said steering shaft; at least one shear pin restraining movement between said steering shaft and said steering shaft sleeve and extending through said steering shaft and said steering shaft sleeve; a steering column, said steering shaft and said steering shaft sleeve being housed within said steering column; a steering column sleeve slideably positioned about said steering column; collapsible plate means positioned adjacent said steering column sleeve; and a press plate member secured to said steering column sleeve and positioned to engage said collapsible plate means and refrain said steering column sleeve, whereby at impact said press plate member engages and collapses said collapsible plate means and said shear pins are sheared so as to allow said steering column sleeve and said steering shaft sleeve to move forward without movement of the steering shaft and the steering column, and wherein said collapsible plate means is further defined as at least one collapsible plate having a portion of reduced cross-sectional area and having end portions adapted to anchor said collapsible plate means; and said press plate member is positioned to engage said portion of reduced cross-sectional area of said collapsible plate.

* * * * *